Dec. 30, 1969  D. E. HOLBERG  3,487,462
BISTATIC RADAR CONFIGURATION NOT REQUIRING
REFERENCE-DATA TRANSMISSION
Filed May 1, 1968
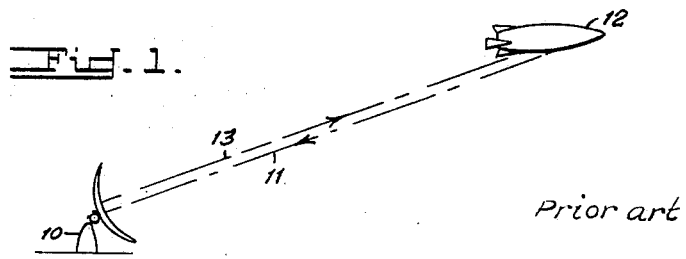
Fig. 1.  Prior art
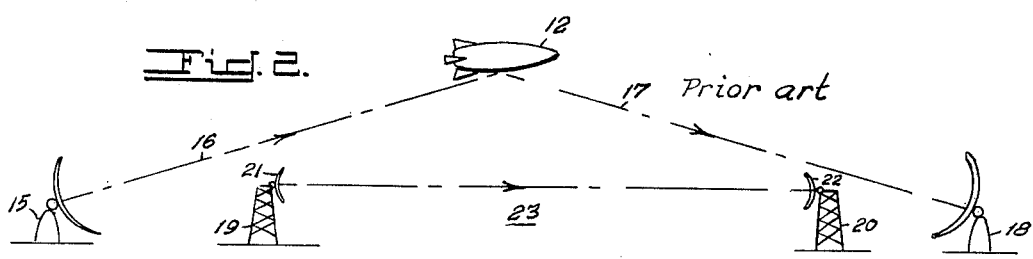
Fig. 2.  Prior art
Fig. 3.
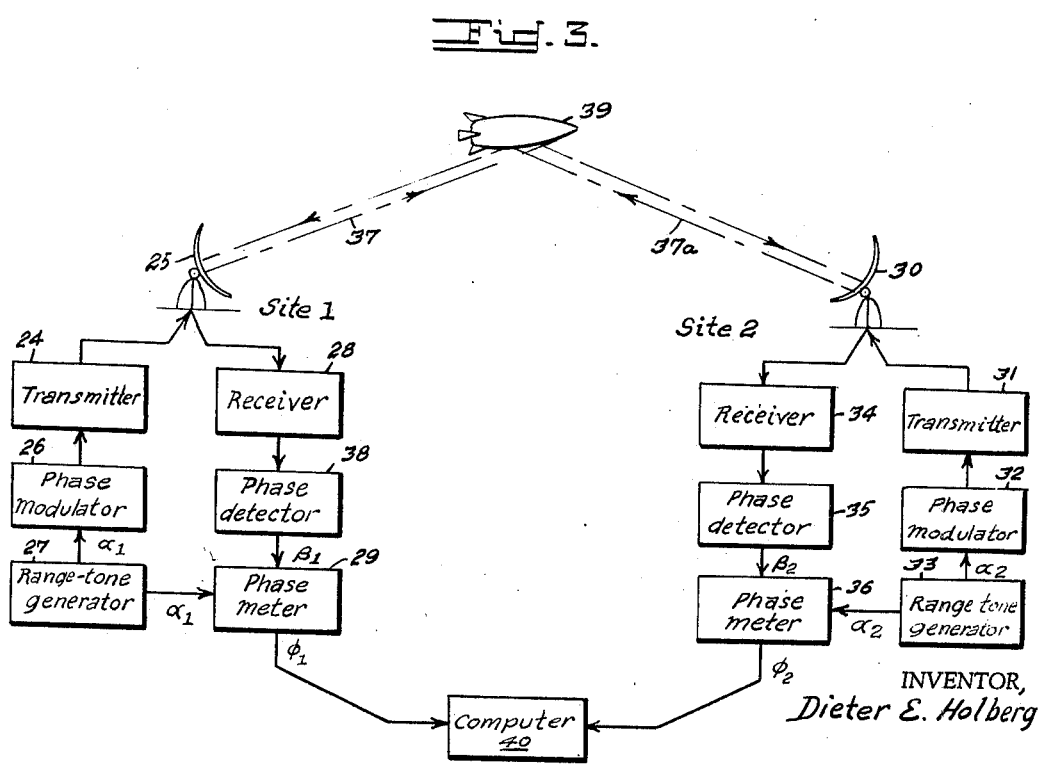
INVENTOR,
Dieter E. Holberg
BY: Harry M. Saragovitz,
Edward J. Kelly &
R. P. Gibson
ATTORNEYS.

United States Patent Office 3,487,462
Patented Dec. 30, 1969

3,487,462
BISTATIC RADAR CONFIGURATION NOT REQUIRING REFERENCE-DATA TRANSMISSION
Dieter E. Holberg, Pacific Palisades, Calif., assignor to the United States of America as represented by the Secretary of the Army
Filed May 1, 1968, Ser. No. 725,677
Int. Cl. G01s 9/04
U.S. Cl. 343—12                  3 Claims

ABSTRACT OF THE DISCLOSURE

A bistatic radar without a reference-data transmission wherein, for example, in a first and second radar station configuration, each transmitter operates on a different carrier frequency. The receiver of the first radar is tuned to the carrier frequency of the second radar and the receiver of the second radar is tuned to the carrier frequency of the first radar. At each radar station, the phase of the received phase modulated signal is measured in a phasemeter with respect to the phase of the local range-tone generator. The outputs of the phasemeters are then transmitted to a computer where they are added to determine the range.

---

The invention described herein may be manufactured, used, and licensed by or for the Government for governmental purposes without the payment to me of any royalty thereon.

In a monostatic radar configuration, the transmitter and receiver are located at the same radar site. In this arrangement, the radar determines the slant range to the target directly from the time delay or phase delay of the received signal with respect to the transmitted signal. When the bistatic radar configuration is utilized, the radar transmitter and receiver are located at different radar sites. At the receiver sites, the time delay or phase delay between a signal reflected from a target and a signal transmitted via reference-link is determined. The bistatic radar measurement is proportional to the loop range, transmitter-target-receiver, minus a constant term caused by the time delay or phase delay of the reference-data transmission link. A multistatic radar configuration is of the form of a bistatic radar configuration, except that several spatially separated receivers are employed.

Accurate calibration of the time delay or phase delay of the reference-data transmission is often difficult or even impossible particularly when line-of-sight conditions between the radar transmitter and receiver either directly or through a fixed relay transponder do not exist. In this case, the accuracy of the system is limited by the accuracy of the reference-link delay. Application of bistatic and multistatic radar configuration is therefore often ruled out by the difficulty of providing a stable reference-link.

The bistatic radar configuration has, however, also some very desirable properties. It greatly reduces the problem of transmitter-receiver isolation which is very important in the case of continuous-wave systems. Also, the bistatic radar cross-section of a target is often much larger than the monostatic or back scatter cross-section of the same target. In particular, when the aspect angle of a target is such that the back scatter cross-section is a minimum, then the bistatic cross-section is usually reasonably large so that bistatic radar tracking can be easily maintained.

An object of the invention is a bistatic radar configuration not requiring a reference-data transmission link.

Another object of the invention is a bistatic radar configuration wherein the use of continuous-wave radars at larger power levels than permissible by feed-through nulling limitations in monostatic operation is obtained.

Another object of the invention is a multistatic radar configuration requiring no reference-data transmission link which permits an increase of accuracy of conventional pulse radars by averaging since the target glint in this multistatic configuration is different for each target aspect angle.

A further object of the invention is a bistatic radar configuration without reference-data transmission link wherein is obtained better angle tracking when the bistatic radar cross-section of the target exceeds the monostatic cross-section.

A still further object of the invention is a bistatic radar configuration without reference-data link providing improved data accuracy in the beacon mode when a missile carrying the beacon is provided with an antenna that has appreciable lobe structure.

The invention will be more fully understood and its objects and advantages further appreciated by referring to the following detailed description taken in conjunction with the accompanying drawings with several figures of which like numerals identify like elements and in which:

FIGURE 1 is a diagrammatic illustration of a monostatic radar configuration;

FIGURE 2 is a diagrammatic illustration of a bistatic radar configuration including a reference-data link; and FIGURE 3 is a diagrammatic illustration of the bistatic radar configuration of the invention.

In FIGURE 1 there is illustrated a monostatic radar configuration in which the transmitter and receiver of radar 10 are located at the same site. Radar 10 determines the slant range to the target directly from the time delay or phase delay of the reflected signal 11 from target 12 with respect to the transmitted signal 13.

A bistatic radar configuration employing microwave reference-data transmission between two radio towers is shown in FIGURE 2 wherein continuous wave radar transmitter 15 transmits a beam of radio frequency energy 16 towards target 12 which reflects it as indicated by 17 to a remotely located continuous wave radar receiver 18. Spaced radio towers 19 and 20 in a line of sight arrangement are remotely located with respect to radar transmitter 15 and radar receiver 18 and support microwave transmitter 21 and microwave receiver 22, respectively, providing the microwave reference-data transmission link 23. At the continuous wave receiver 18 site, the time delay or phase delay between a signal reflected by target 12 and a signal transmitted via a reference-data transmission link 23 is determined.

The invention comprises a bistatic radar configuration without the need for a reference-data transmission link, one embodiment being shown in FIGURE 3 wherein a radar at site 1 is remotely located from a radar at site 2. At site 1, the radar comprises a continuous wave transmitter 24 coupled to the radar antenna system 25 and modulated by phase modulator 26 which has coupled to its input a range-tone generator 27. A receiver 28, also coupled to antenna system 25, has its output coupled to a phase detector 38 the output of which is coupled to phasemeter 29 to which is also coupled to the output of range-tone generator 27. The radar at site 2 is identical to that at site 1 and consists of antenna system 30 to which is coupled continuous wave transmitter 31 and receiver 34. Transmitter 31 is phase modulated by phase modulator 32 to which is coupled the output of range tone generator 33. The output of receiver 34 is coupled to input of phase detector 35 which in turn is coupled to input of phasemeter 36 which also has the output of range-tone generator 33 coupled thereto.

The phase modulated carrier 37 of a selected frequency radiated by the radar at site 1 is reflected by target 39 and received by antenna system 30 at radar site 2. The phase modulated carrier 37a originating at radar site 2 of a frequency other than said selected frequency is also reflected by target 39 and received by antenna system 25 at radar site 1. Receiver 28 is tuned to the frequency of carrier 37a and receiver 34 is turned to the frequency of carrier 37. The use of different frequencies as recited above provides for frequency-wise isolation of receivers from radiations of close by transmitters. The range-tone signals generated separately in range-tone generators 27 and 33 are neither phase coherent nor even of exactly the same frequency and are modulated on the respective carrier frequencies of the radars at sites 1 and 2 by means of phase modulators 26 and 32, respectively. For simplicity, the following description is limited to a single range-tone whose frequency may be considered to be in the order of one megacycle. The phases of the range-tone generators 27 and 33 are:

$$\alpha_1(t) = \omega_1 t + \psi_1 \text{ at Site 1}$$

and $$\alpha_2(t) = \omega_2 t + \psi_2 \text{ at Site 2}$$

where:

$\alpha$ = phase of range generator
$\omega$ = circular frequency of the range tones
$\psi$ = arbitrary phase angle
$t$ = time While today's technology permits keeping $\omega_1$ and $\omega_2$ equal to within a few parts in $10^{11}$, frequency equality to within one part in $10^9$ is sufficient in this case.

The phase $\alpha_1 t$ is modulated on transmitter 24, transmitted to the target 39, reflected from target 39, and received and detected by the radar at site 2. If the loop-range time delay is equal to $\tau$ the phase of the signal detected by the radar at site 2 at time $t$ may be written:

$$\beta_2(t) = \alpha_1(t-\tau) = \omega_1 t - \omega_1 \tau + \psi$$

This phase is measured in phasemeter 36 with respect to the phase of local range-tone generator 33. The output of phasemeter 36 at site 2 is:

$$\phi_2 t = \beta_2(t) - \alpha_2(t) = (\omega_1 - \omega_2)t + (\psi_1 - \psi_2) - \omega_1 \tau$$

Similarly, the signal from site is received, detected and measured at site 1. Assume that, due to a timing error, the phasemeter 29 is read at time $t + \Delta t$ rather than at time $t$. The output of the pasemeter 29 at site 1 is then:

$$\phi_1(t+\Delta t) = \beta_1(t+\Delta t) - \alpha_1(t+\Delta t)$$
$$= \alpha_2(t+\Delta t) - \tau) - \alpha_1(t+\Delta t)$$
$$= \omega_2 t + \omega_2 \Delta t - \omega_2 \tau + \psi_2 - (\omega_1 t + \omega_1 \Delta t + \psi_1)$$
$$= (\omega_2 - \omega_1)t + (\omega_2 - \omega_1)\Delta t + (\psi_2 - \psi_1) - \omega_2 \tau$$

The phasemeter outputs $\phi_1$ and $\phi_2$ are either electrically transmitted, or recorded and physically transmitted to a computer where they are added so that:

$$\phi_1(t+\Delta t) + \phi_2(t) = (\omega_2 - \omega_1)\Delta t - (\omega_2 + \omega_1)\tau$$

The first term is an insignificant ranging error due to timing. Assuming one-megacycle range-tones with one part in $10^9$ frequency stability and one millisecond timing difference, the ranging error is on the order of:

$$2\pi \times 10^6 \times 10^{-9} \times 10^{-3} = 2\pi 10^{-6} \text{ radian} = 0.5 \times 10^{-3} \text{ feet}$$

The second term is the desired loop-range measurement average over the two range-tone frequencies.

An equivalent derivation in terms of transmission time rather than phase delays would show applicability of the method for pulse signals.

A similar derivation would show applicability of the approach to Doppler velocity measurements made on the carrier frequencies of the two signals.

Utilizing the invention to achieve a trilateration solution (i.e. a solution for target position on the basis of three independent loop-range measurements) three radar sites would be required, each of them incorporating one transmitter and two receivers. To achieve least squares solutions on the basis of $n$ loop-range measurements, there would be required $n$ radar sites, each of them containing one transmitter and $n-1$ receiver. However, the multiplicity of measurements contributes to the accuracy of the solution.

Although a specific embodiment of the invention has been illustrated and described, it will be understood that this is but illustrative and that various modifications may be made therein without departing from the spirit of the invention and the scope of the appended claims.

I claim:

1. A bistatic radar system comprising, a first radar station, a second radar station remotely located from said first radar station, each said radar station including a continuous wave transmitter and receiver coupled to directive antenna means, the transmitter of said first radar station tuned to one frequency, the transmitter of said second radar station tuned to another frequency, the receiver of said first radar station adapted to receive the target reflected beam of said second radar station and the receiver of said second radar station adapted to receive the target reflected beam of said first radar station, a first signal generating means coupled through modulation means to the transmitter of said first radar station providing phase modulation therefor, a second signal generating means coupled through modulation means to the transmitter of said second radar station providing phase modulation therefor, means coupling the output of the receiver of said first radar station to means for measuring the phase of the target reflected beam of said second radar station received by said first radar station with respect to the phase of the signal of said first signal generating means, and means coupling the output of the receiver of said second radar station to means for measuring the phase of the target reflected beam of said first radar station received by said second radar station with respect to the phase of the signal of said second signal generating means.

2. A bistatic radar system not requiring a reference-data link transmission comprising, a first radar consisting of a first transmitter of the continuous wave type operating on a selected carrier frequency, a first range-tone generator, the signal of said first range-tone generator coupled to said first transmitter by means of a phase modulator whereby said first transmitter is phase modulated, means coupling said first transmitter to a first directive antenna means for radiating a phase modulated radar beam signal towards a target, a first receiver coupled to said first directive antenna means, a first phasemeter, a phase detector coupling the output of said first receiver to the input of said first phasemeter, means coupling the first range-tone generator signal to the input of said first phasemeter, a second radar remotely located from said first radar operating on a carrier frequency other than said selected carrier frequency comprising a second transmitter of the continuous wave type operating on carrier frequency other than said selected carrier frequency, a second range-tone generator, the signal of said second range-tone generator coupled to said second transmitter by means of a phase modulator whereby said second transmitter is phase modulated, means coupling said second transmitter to a second directive antenna means for radiating a phase modulated radar beam signal towards a target, a second receiver coupled to said antenna means, a second phasemeter, a phase detector coupling the output of said second receiver to the input of said second phasemeter, means coupling the second range-tone generator signal to the input of said second phasemeter, said first receiver tuned to the carrier frequency of the phase modulated radar beam signal of said second transmitter which is target reflected and coupled to said first receiver through said first directive antenna means, the phase of the radar beam signal received by said first receiver being measured in said first phasemeter with respect to the phase of the signal of said first range-tone generator, said second receiver tuned to carrier frequency of the phase modulated radar beam signal of said first transmitter which is target reflected and coupled to said second receiver through said second directive antenna means, the phase of the radar beam signal received by said second receiver being measured in said second phasemeter with respect to the phase of the signal of said second range-tone generator.

3. The invention in accordance with claim 2 including electronic computer means, and means coupling the output signals of said first and second phasemeters to said computer means wherein they are added to obtain target range.

References Cited

UNITED STATES PATENTS

| | | | |
|---|---|---|---|
| 3,290,677 | 12/1966 | Jacob | 343—12 X |
| 3,377,590 | 4/1968 | Wendell | 343—12 |
| 3,396,393 | 8/1968 | Wagner | 343—14 |

RODNEY D. BENNETT, Jr., Primary Examiner

J. P. MORRIS, Assistant Examiner

U.S. Cl. X.R.

343—17.5